(12) United States Patent
Patel et al.

(10) Patent No.: US 12,063,572 B2
(45) Date of Patent: Aug. 13, 2024

(54) METHODS AND SYSTEMS FOR VEHICLE DATA COLLECTION

(71) Applicant: HAAS, Inc., Chicago, IL (US)

(72) Inventors: Jigar Patel, Arlington Heights, IL (US); Cory Hohs, Chicago, IL (US)

(73) Assignee: HAAS, Inc., Chicago, IL (US)

( * ) Notice: Subject to any disclaimer, the term of this patent is extended or adjusted under 35 U.S.C. 154(b) by 173 days.

(21) Appl. No.: 17/990,592

(22) Filed: Nov. 18, 2022

(65) Prior Publication Data

US 2024/0171943 A1    May 23, 2024

(51) Int. Cl.
*H04W 4/029* (2018.01)
*H04W 4/021* (2018.01)

(52) U.S. Cl.
CPC .......... *H04W 4/029* (2018.02); *H04W 4/021* (2013.01)

(58) Field of Classification Search
CPC .......... G08G 1/123; G07C 5/008; G07C 5/08; H04W 4/029; H04W 4/021
See application file for complete search history.

(56) References Cited

U.S. PATENT DOCUMENTS

| | | | |
|---|---|---|---|
| 8,466,805 B2 | 6/2013 | Waymire | |
| 8,612,131 B2 | 12/2013 | Gutierrez et al. | |
| 9,333,913 B1 | 5/2016 | Elders et al. | |
| 9,648,107 B1 | 5/2017 | Penilla et al. | |
| 10,127,813 B2 | 11/2018 | Walsh et al. | |
| 10,169,991 B2 | 1/2019 | Massey et al. | |
| 10,189,483 B2* | 1/2019 | Grossman | B60W 50/14 |
| 10,891,858 B2 | 1/2021 | Walsh et al. | |
| 2006/0058950 A1 | 3/2006 | Kato et al. | |
| 2009/0309709 A1* | 12/2009 | Bevacqua | H04W 12/126 340/426.18 |
| 2010/0289659 A1* | 11/2010 | Verbil | H04L 67/52 340/670 |
| 2012/0139760 A1 | 6/2012 | Bevacqua et al. | |
| 2015/0279125 A1* | 10/2015 | Chronowski | G07C 5/008 701/29.2 |
| 2016/0098868 A1* | 4/2016 | Lambert | G07C 5/008 701/29.1 |

(Continued)

OTHER PUBLICATIONS

Chen, Lei et al. "Cloud-based traffic control for interaction between autonomous vehicles and emergency vehicles", 26th ITS World Congress, Singapore, Oct. 21-25, 2019, 11 pgs.

(Continued)

*Primary Examiner* — An T Nguyen
(74) *Attorney, Agent, or Firm* — LOZA & LOZA LLP

(57) ABSTRACT

Embodiments of a method and non-transitory computer readable mediums for vehicle data collection are disclosed. In an embodiment, the method for vehicle data collection includes receiving, at a cloud computing system, vehicle data that indicates a location of a vehicle and a data reporting mode of the vehicle, determining, by the cloud computing system, whether the vehicle is located in an alerting zone using the vehicle data, determining, by the cloud computing system, if the data reporting mode of the vehicle needs to be changed based on the alerting zone determination, and generating, by the cloud computing system, a policy message for transmission to the vehicle when the data reporting mode needs to be changed, where the policy message indicates an updated data reporting mode of the vehicle.

20 Claims, 9 Drawing Sheets

(56) References Cited

U.S. PATENT DOCUMENTS

| | | | |
|---|---|---|---|
| 2016/0133130 A1 | 5/2016 | Grimm et al. | |
| 2016/0198002 A1 | 7/2016 | Penilla et al. | |
| 2016/0203652 A1* | 7/2016 | Throop | G07C 5/008 |
| | | | 701/1 |
| 2016/0293008 A1* | 10/2016 | Nagata | H04W 4/02 |
| 2017/0084175 A1 | 3/2017 | Sedlik et al. | |
| 2017/0249839 A1 | 8/2017 | Becker et al. | |
| 2020/0037115 A1* | 1/2020 | Ady | H04W 40/242 |
| 2020/0101844 A1 | 4/2020 | Miller, Jr. et al. | |
| 2020/0126412 A1 | 4/2020 | James | |
| 2021/0035378 A1* | 2/2021 | Lekutai | G07C 5/008 |
| 2021/0127062 A1* | 4/2021 | Kuehnle | H04N 7/183 |
| 2022/0068130 A1* | 3/2022 | Brooks | G08G 1/096844 |
| 2022/0406172 A1* | 12/2022 | Mezaael | H04W 4/021 |

OTHER PUBLICATIONS

International Search and Written Opinion, PCT/US2023/080356, Apr. 5, 2024, 14 pgs.

* cited by examiner

*800*

| Parameter | Alert Mode | Conservation Mode |
|---|---|---|
| Frequency Of Transmissions | 10 Per Minute | 2 Per Minute |
| Content A (e.g., Longitude/Latitude) | Included | Included |
| Content B (e.g., Speed And Direction) | Included | Not Included |
| Physical Channel Options | All Available Channels | Only Energy Efficient Channels |
| Network Options 5G Vs 3/4G? | 3G, 4G, Or 5G | 3G Or 4G |

FIG. 8

METHODS AND SYSTEMS FOR VEHICLE DATA COLLECTION

BACKGROUND

When monitoring vehicles, safety hazards, and other alerts over wireless connections, safety systems may collect data according to various fixed configurations. For example, data may be collected according to fixed configurations that involve a predetermined reporting frequency, which may be difficult to change. Consequently, because the fixed configuration may be difficult to change, collecting data over wireless connections according to such fixed configurations can be a drag on resources such as bandwidth (e.g., wireless network bandwidth).

SUMMARY

Embodiments of a method and non-transitory computer readable mediums for vehicle data collection are disclosed. In an embodiment, the method for vehicle data collection includes receiving, at a cloud computing system, vehicle data that indicates a location of a vehicle and a data reporting mode of the vehicle, determining, by the cloud computing system, whether the vehicle is located in an alerting zone using the vehicle data, determining, by the cloud computing system, if the data reporting mode of the vehicle needs to be changed based on the alerting zone determination, and generating, by the cloud computing system, a policy message for transmission to the vehicle when the data reporting mode needs to be changed, where the policy message indicates an updated data reporting mode of the vehicle.

In an embodiment, determining whether the vehicle is located in the alerting zone includes receiving an alerting vehicle data message that includes alerting vehicle information, determining a geographical area of the alerting zone using the alerting vehicle information, and comparing the location of the vehicle to the geographical area of the alerting zone.

In an embodiment, the geographical area of the alerting zone is defined by a set of geographical coordinates that are within a predetermined range set.

In an embodiment, determining if the data reporting mode of the vehicle needs to be changed includes receiving an alerting vehicle data message that includes alerting vehicle information, determining a desired data reporting mode associated with the alerting zone using the alerting vehicle information, and comparing the data reporting mode of the vehicle to the desired data reporting mode associated with the alerting zone.

In an embodiment, determining whether the vehicle is located in the alerting zone includes receiving alerting vehicle information that includes alerting vehicle information, determining a geographical area of the alerting zone using the alerting vehicle information, comparing the location of the vehicle to the geographical area of the alerting zone, determining if the data reporting mode of the vehicle needs to be changed includes determining a desired data reporting mode associated with the alerting zone using the alerting vehicle information, and comparing the data reporting mode of the vehicle to the desired data reporting mode associated with the alerting zone.

In an embodiment, the alerting vehicle information is included in an alerting vehicle data message that is received from at least one of an alerting vehicle and an alert tracking system.

In an embodiment, the method includes determining that the vehicle is located in the alerting zone, determining that the data reporting mode is different from a desired data reporting mode, and generating the policy message for transmission to the vehicle, where the policy message indicates the desired data reporting mode as the updated data reporting mode.

In an embodiment, the method includes determining that the vehicle is located in the alerting zone, determining that the data reporting mode is the same as a desired data reporting mode, and returning to the step of receiving the vehicle data.

In an embodiment, the method includes determining that the vehicle is located outside the alerting zone, determining that the data reporting mode is different from a desired data reporting mode, and generating the policy message for transmission to the vehicle, where the policy message indicates the desired data reporting mode as the updated data reporting mode.

In an embodiment, the method includes determining that the vehicle is located outside the alerting zone, determining that the data reporting mode is the same as a desired data reporting mode, and returning to the step of receiving the vehicle data.

In an embodiment, the updated data reporting mode is an alert mode, and where a preset alert mode configuration includes predefined vehicle data content, predefined transmission parameters, predefined network options, and predefined physical channel options.

In an embodiment, the updated data reporting mode is a conservation mode, and where a preset conservation mode configuration includes predefined vehicle data content, predefined transmission parameters, predefined network options, and predefined physical channel options.

In an embodiment, the vehicle data is included in a vehicle data message that includes a vehicle identifier (ID) that corresponds to the vehicle, location information that corresponds to the location of the vehicle, and a data reporting mode ID that corresponds to the data reporting mode of the vehicle.

In an embodiment, the policy message includes a vehicle ID that corresponds to the vehicle, and an updated data reporting mode ID that corresponds to the updated data reporting mode.

In an embodiment, the alerting zone is determined from an alerting vehicle data message that includes an alert ID that corresponds to an alerting vehicle, and alerting vehicle information that indicates at least one of a location of the alerting vehicle, a speed of the alerting vehicle, and a direction of the alerting vehicle.

In an embodiment, generating the policy message for transmission to the vehicle includes sending, by a safety cloud, the policy message to a transceiver of the vehicle via a service provider network.

In an embodiment, generating the policy message for transmission to the vehicle includes sharing, by a safety cloud, the policy message with a vehicle tracking system, and sending, by the vehicle tracking system, the policy message to a transceiver of the vehicle via a first service provider network.

In an embodiment, generating the policy message for transmission to the vehicle includes sending, by a safety cloud, the policy message to a broadcasting tower near the alerting zone via a first service provider network, and sending, by the broadcasting tower, the policy message to a transceiver of the vehicle via a second service provider network.

A non-transitory computer readable medium for vehicle data collection is also disclosed. In an embodiment, the non-transitory computer readable medium includes instructions to be executed in a computer system, where the instructions when executed in the computer system perform a method comprising receiving vehicle data that indicates a location of a vehicle and a data reporting mode of the vehicle, determining, using the vehicle data, whether the vehicle is located in an alerting zone, determining if the data reporting mode of the vehicle needs to be changed based on the alerting zone determination, and generating a policy message for transmission to the vehicle when the data reporting mode needs to be changed, where the policy message indicates an updated data reporting mode of the vehicle.

Another non-transitory computer readable medium for vehicle data collection is also disclosed. In an embodiment, the non-transitory computer readable medium includes instructions to be executed in a computer system, where the instructions when executed in the computer system perform a method comprising sending vehicle data that indicates a location of a vehicle and a data reporting mode of the vehicle, receiving a policy message when the data reporting mode needs to be changed, where the policy message indicates an updated data reporting mode of the vehicle based on the location of the vehicle, and changing the data reporting mode of the vehicle according to the updated data reporting mode.

Other aspects in accordance with the invention will become apparent from the following detailed description, taken in conjunction with the accompanying drawings, illustrated by way of example of the principles of the invention.

BRIEF DESCRIPTION OF THE DRAWINGS

FIG. 8 is a table defining parameters of data reporting modes.

Throughout the description, similar reference numbers may be used to identify similar elements.

DETAILED DESCRIPTION

Figure 1:
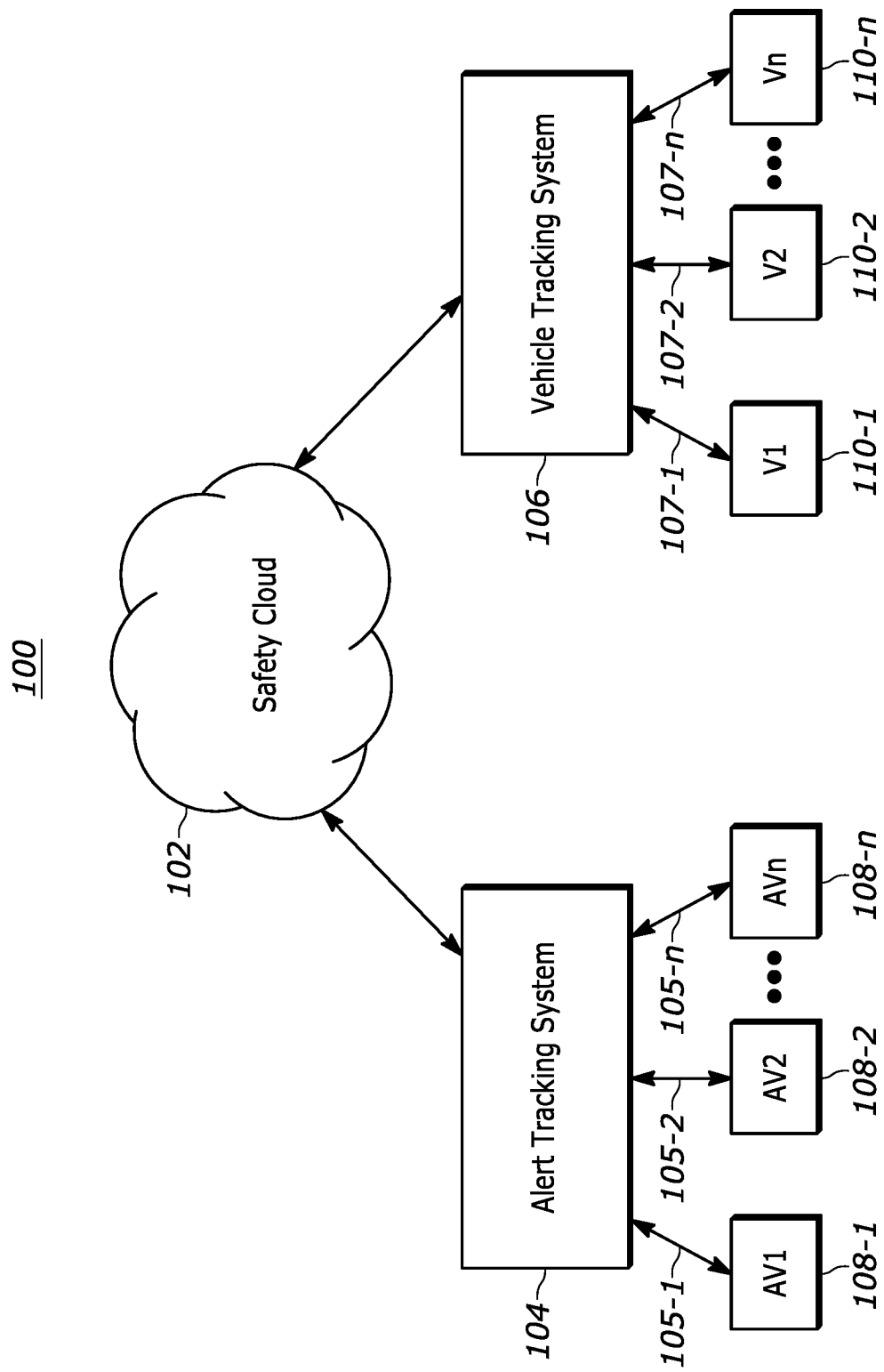
FIG. 1 is a high-level overview of a safety system.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

A device may be implemented in a safety system to track vehicles (e.g., alerting vehicles and/or consumer vehicles). As an example, the safety system may be implemented by a computer system that connects to the safety system and to a transceiver of one or more vehicles. In such an example, the computer system may communicate information between the safety system and the vehicle to track the vehicle and/or send alerts when the vehicle may be near an alerting zone (e.g., a safety hazard, an emergency vehicle route, a construction zone, etc.).

In some embodiments, location data is shared with the safety system by the computer system and/or directly from the vehicles. Parameters associated with sharing the location data may be dependent on whether a vehicle is in an alerting zone. Vehicles may send vehicle data to the computer system and/or to the software system over a wireless connection according to a fixed configuration. In some embodiments, sending the vehicle data over a wireless connection according to the fixed configuration includes sending the vehicle data at a fixed frequency (e.g., once per second) and including certain content, e.g., vehicle information, location information, etc. In such an embodiment, the vehicle data sent over a wireless connection according to the fixed configuration may be considered static because the fixed configuration remains unchanged regardless of whether the vehicle is in or outside an alerting zone.

Consequently, more resources (e.g., wireless bandwidth and power) than needed may be consumed when the vehicle is not near an alerting zone, or inadequate resources may be used when the vehicle is near the alerting zone. For example, more or less location data can correspond to more or less resources. As such, the safety system may experience limited efficiency, performance, and reliability. If the vehicle is not in the alerting zone, then less data may need to be shared (e.g., using less frequent transmissions). If the vehicle is in the alerting zone, then more data may need to be shared (e.g., more frequent transmission). In some embodiments, the location data is included in vehicle data for consumer vehicles, and in alerting vehicle data for alerting vehicles.

In accordance with an embodiment of the invention, a technique for vehicle data collection involves receiving, at a cloud computing system, vehicle data that indicates a location of a vehicle and a data reporting mode of the vehicle, determining, by the cloud computing system, whether the vehicle is located in an alerting zone using the vehicle data, determining, by the cloud computing system, if the data reporting mode of the vehicle needs to be changed based on the alerting zone determination, and generating, by the cloud computing system, a policy message for transmission to the vehicle when the data reporting mode needs to be changed, wherein the policy message indicates an updated data reporting mode of the vehicle.

By changing a data reporting mode of a vehicle based on a location of the vehicle relative to an alerting zone, data exchanged between the vehicle and a safety cloud over a wireless connection can be dynamically managed to preserve wireless bandwidth, conserve power, and reduce load on the safety cloud. For example, data reporting modes may have a set of configurations for providing vehicle data over a wireless connection that is based on whether a vehicle is located in an alerting zone or outside the alerting zone. When the vehicle is located in the alerting zone, it may be important to use a data reporting mode that enables more accurate data and/or more frequent reporting of the vehicle. Alternatively, when the vehicle is located outside the alerting zone, it may be possible to use a data reporting mode that enables conservation of energy and/or storage by reporting data less frequently. As such, changing a data reporting mode of a vehicle based on the vehicle's location can improve efficiency, performance, and reliability of safety systems. The enhancement in safety that comes with increased reporting is a worthwhile tradeoff when vehicles are in the alerting zone because the increased reporting may enable increased accuracy in vehicle localization. Alternatively, the conservation of resources outweighs enhancements in safety when the vehicles are outside the alerting zone because there may be less of a need for accurate vehicle localization.

An "alerting zone" may be described herein as a geographical area near a safety hazard (e.g., a construction zone, a car accident, a vehicle stopped along the side of the road, a lane closure, a road closure, etc.), near an alerting vehicle, near a route of the alerting vehicle, or any combination thereof. Examples of an alerting zone may include, but are not limited to, a geographical area that is within an X (X represents a positive value) mile radius of a safety hazard, a geographical area that covers a projected route of an alerting vehicle (plus X miles along each side of the route), or a geographical area that surrounds an alerting vehicle (by X miles) and that changes as the alerting vehicle changes locations (e.g., travels along a projected route). In some embodiments, the geographical area of the alerting zone may be defined by a set of geographical coordinates that are within a predetermined range set. In some embodiments, the geographical area may resemble a circle, an oval, a rectangle, a line, or other shape. In an embodiment, the alerting zone is determined by/in a safety cloud of a safety system. An example of a safety system is described in further detail with reference to FIG. 1.

FIG. 1 is a high-level overview of a safety system 100. The safety system 100 includes a safety cloud 102 that is connected to an alert tracking system 104 and to a vehicle tracking system 106. The safety cloud 102 may be implemented via software running on a computing system such as a remote server, a public cloud (e.g., Amazon Web Services (AWS), Google Cloud, Microsoft Azure, etc.), and/or a private cloud. In an embodiment, the safety cloud is implemented via a cloud computing system. The alert tracking system 104 and/or the vehicle tracking system 106 may be implemented via third-party computing systems, including for example, software running on a computing system such as a remote server, a public cloud, and/or a private cloud.

The alert tracking system 104 connects to one or more alerting vehicles (AVs), implemented as a AV1 108-1, AV2 108-2, and AVn 108-*n* (n represents an integer greater than two), via, for example, a service provider wireless network or a private wireless network (e.g., 3G, 4G, 5G, etc.). AV1 108-1, AV2 108-2, and AVn 108-*n* are connected to the alert tracking system 104 over a wireless connection via a first connection 105-1, a second connection 105-2, and an nth connection 105-*n*, respectively. Examples of the alerting vehicles include emergency vehicles (e.g., a police car, an ambulance, a firetruck, a military vehicle, or the like), safety vehicles (e.g., a construction vehicle, a towing vehicle, or the like), and/or other vehicles/devices that are capable of sending alerting vehicle data and/or connecting to the alert tracking system 104 over a wireless connection via the service provider network. The AVs 108-1, 108-2, and 108-*n* may be included in an emergency vehicle fleet (e.g., a fleet of police cars corresponding to a police department, a fleet of firetrucks corresponding to a fire department, etc.). In an embodiment, the AVs 108-1, 108-2, and 108-*n* are equipped with radios (e.g., a fixed radio and/or a mobile radio) to implement a wireless connection. Although an AV may commonly be a vehicle, the AV may also be a radio or other similar device capable of sending alerting (vehicle) data and/or of connecting to the alert tracking system 104.

In an embodiment, AV1 108-1, AV2 108-2, and AVn 108-*n* send alerting vehicle data to the alert tracking system 104, such that the alerting vehicle data corresponds to AV1 108-1, AV2 108-2, and/or AVn 108-*n*. As an example, the alerting vehicle data may include an alert ID that corresponds to an alerting vehicle (e.g., AV1 108-1, AV2 108-2, or AVn 108-*n*) and alerting vehicle information that corresponds to the alerting vehicle. The alert ID may indicate whether emergency lights of an alerting vehicle are on/off, and the alerting vehicle information may indicate a location (e.g., longitude and latitude coordinates), a speed, and/or a direction of the alerting vehicle.

The vehicle tracking system 106 connects to one or more vehicles (V), implemented as a V1 110-1, V2 110-2, and Vn 110-*n* (n represents an integer greater than two), via a service provider wireless network. V1 110-1, V2 110-2, and Vn 110-*n* are connected over a wireless connection to the vehicle tracking system via a first connection 107-1, a second connection 107-2, and an nth connection 107-*n*, respectively. As described herein, a "vehicle" may refer to a consumer vehicle (e.g., a car, a motorcycle, or the like). The Vs 110-1, 110-2, and 110-n may be included in a vehicle fleet (e.g., a fleet of cars owned by a company). In an embodiment, the Vs 110-1, 110-2, and 110-n are equipped with radios (e.g., a fixed radio and/or a mobile radio) to implement a wireless connection. In an embodiment, V1 110-1, V2 110-2, and Vn 110-n periodically send vehicle data to the vehicle tracking system 106 via the service provider network. As an example, the vehicle data may include a vehicle ID that corresponds to a vehicle (e.g., V1 110-1, V2 110-2, or Vn 110-n), location information (e.g., longitude and latitude coordinates) that corresponds to a location of the vehicle, and/or a data reporting mode ID that corresponds to a data reporting mode of the vehicle. Although V1 110-1, V2 110-2, and Vn 110-n may commonly be vehicles, V1, V2, and/or Vn may also be a radio, a smartphone, or other similar device capable of sending (vehicle) data and/or of connecting to the vehicle tracking system 106.

In some embodiments, the safety cloud 102 receives the alerting vehicle data from AV1 108-1, AV2 108-2, and/or AVn 108-n via the alert tracking system 104, and receives the vehicle data from V1 110-1, V2 110-2, and/or Vn 110-n via the vehicle tracking system 106. The safety cloud 102 may use the alerting vehicle data to determine a geographical area of an alerting zone and a desired data reporting mode that is associated with the alerting zone. The safety cloud 102 may use the vehicle data to determine whether a vehicle is located in the alerting zone, and to determine whether a data reporting mode of the vehicle needs to be updated based on the alerting zone determination.

In an embodiment, if the data reporting mode of a vehicle does not need to be updated, then the safety cloud does not generate a policy message to trigger a change in the data reporting mode, and the safety cloud continues to receive the vehicle data. As an example, if a vehicle is located in the alerting zone and the data reporting mode of the vehicle is the same as the desired data reporting mode, then the safety cloud continues to receive vehicle data from the vehicle according to the current data reporting mode. As another example, if the vehicle is located outside the alerting zone and the data reporting mode of the vehicle is the same as the desired data reporting mode, then the safety cloud continues to receive vehicle data from the vehicle according to the current data reporting mode.

Alternatively, if the safety cloud determines that the data reporting mode of the vehicle needs to be changed, then the safety cloud generates a policy message that indicates the desired data reporting mode. As an example, if the vehicle is located in the alerting zone and the data reporting mode of the vehicle is different from the desired data reporting mode associated with the alerting zone, then a policy message is generated by the safety cloud and transmitted to the vehicle. In such an example, transmitting the policy message to the vehicle involves the safety cloud triggering a vehicle tracking system to send the policy message via a wireless connection. As another example, if the vehicle is located outside the alerting zone and the data reporting mode of the vehicle is different from the desired data reporting mode associated with the alerting zone, then the policy message is generated and sent to the vehicle via a wireless connection. In such examples, the policy message indicates the desired data reporting mode as the data reporting mode that should be immediately implemented.

Examples of how a data reporting mode is determined based on whether a vehicle is outside an alerting zone or in an alerting zone are described in further detail with reference to FIG. 2A and FIG. 2B, respectively.

Figure 2A:
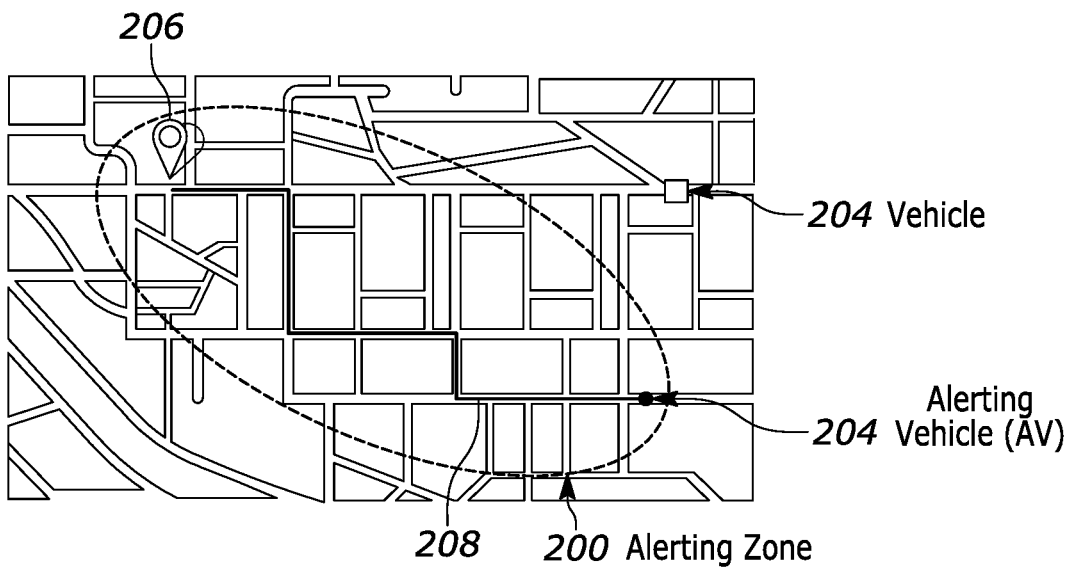
FIG. 2A depicts an example of a vehicle located outside an alerting zone.

FIG. 2A depicts an example of a vehicle 202 located outside an alerting zone 200. In the example illustrated by FIG. 2A, the alerting zone 200 is a geographical area that surrounds an alerting vehicle 204. In the example, the alerting zone 200 includes a destination 206 of the alerting vehicle 204 and a projected route 208 of the alerting vehicle to the destination. The destination 206 may be, for example, an emergency site (e.g., a car accident, a structure fire, a crime site, or the like), a safety hazard (e.g., a weather hazard, a road closure, a lane closure, a road obstruction, or the like), or other similar alert triggering destination. When the vehicle 202 is located outside the alerting zone 200, a data reporting mode of the vehicle may report data in a manner that requires less resources (e.g., less frequent transmission of vehicle data). For example, the data reporting mode of the vehicle 202 may be a conservation mode where vehicle data is sent according to a preset conservation mode configuration that involves less frequent wireless transmissions of vehicle data than a preset alert mode configuration. In such an example, the preset conservation mode configuration includes predefined vehicle data content, predefined transmission parameters, predefined network options, and predefined physical channel options which are described in further detail with reference to FIG. 8.

Figure 2B:
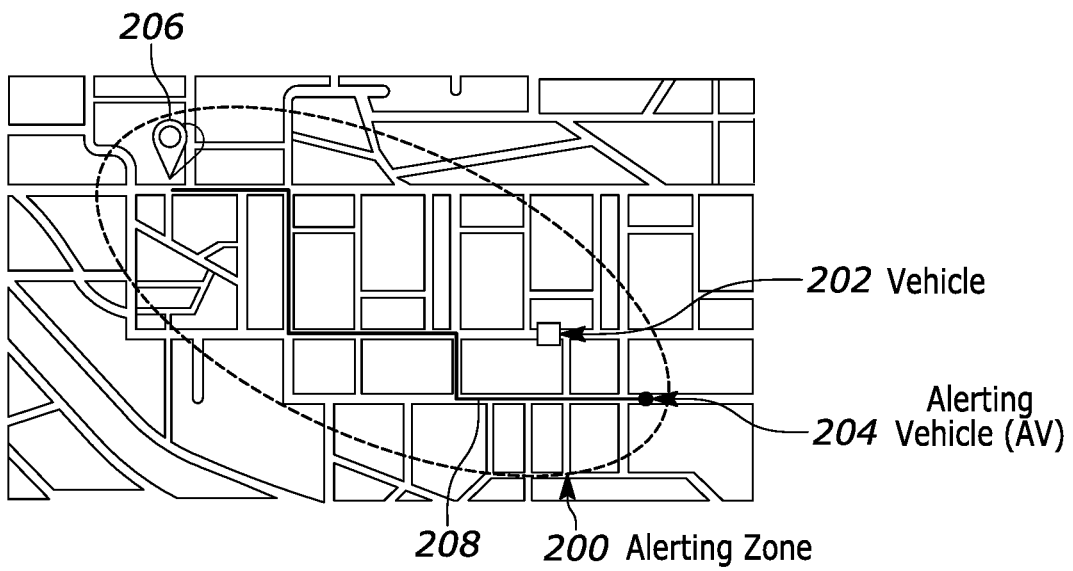
FIG. 2B depicts an example of a vehicle located in an alerting zone.

FIG. 2B depicts an example of the vehicle 202 located in the alerting zone 200. In the example shown by FIG. 2B, the alerting zone 200 includes the alerting vehicle 204, the projected route 208 of the alerting vehicle, and the destination 206 of the alerting vehicle as described with reference to FIG. 2A. In contrast to FIG. 2A, the vehicle 202 shown in FIG. 2B is located in the alerting zone 200. When the vehicle 202 is located in the alerting zone 200, a data reporting mode of the vehicle may report data in a manner that requires more resources (e.g., more frequent transmission of vehicle data). For example, the data reporting mode of the vehicle 202 may be an alert mode where vehicle data is sent over a wireless connection according to a preset alert mode configuration that involves more frequent wireless transmissions of vehicle data that a preset conservation mode configuration. In such an example, the preset conservation mode configuration includes predefined vehicle data content, predefined transmission parameters, predefined network options, and predefined physical channel options which are described in further detail with reference to FIG. 8.

Figure 3A:
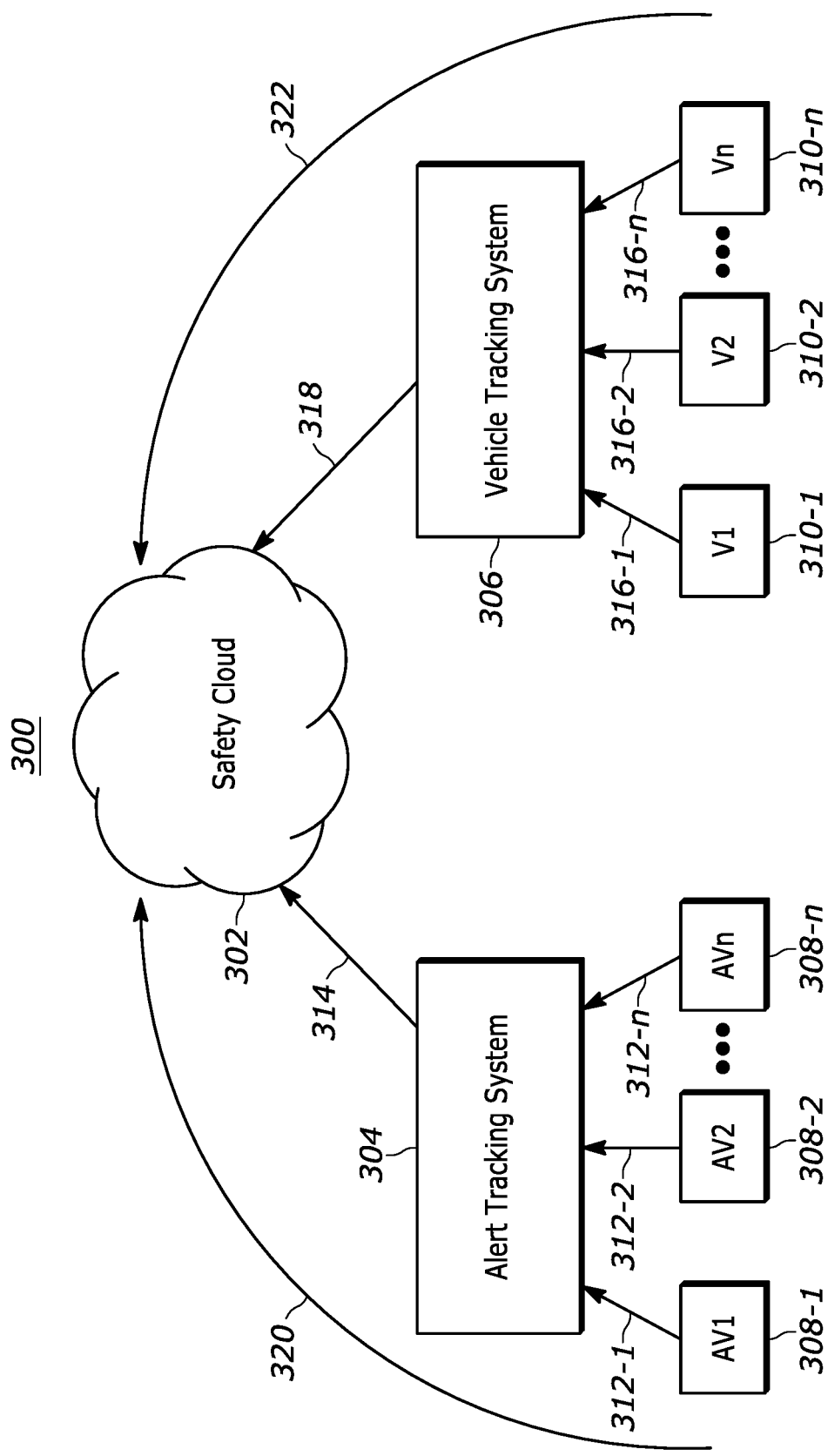
FIG. 3A illustrates the flow of data to a safety cloud.
Figure 3B:
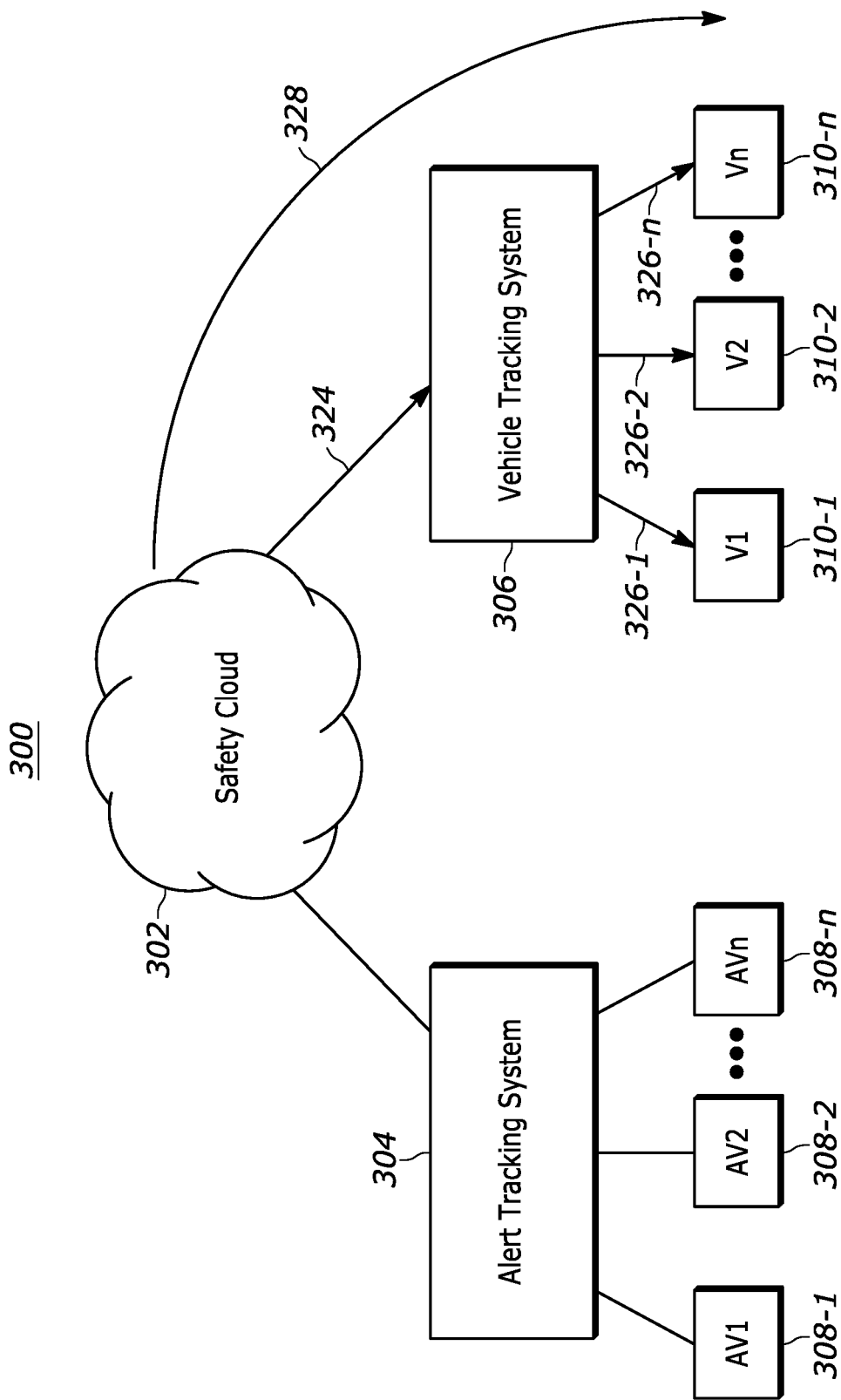
FIG. 3B illustrates the flow of data to vehicles.

Examples that illustrate the flow of data within a safety system are described herein with reference to FIG. 3A and FIG. 3B.

FIG. 3A illustrates the flow of data to a safety cloud. The flow of data to the safety cloud may represent a process for collecting data (e.g., from alerting vehicles and consumer vehicles). In particular, the example of FIG. 3A illustrates a safety system 300 that includes a safety cloud 302, an alert tracking system 304 that communicates with AV1 308-1, AV2 308-2, and/or AVn 308-n, and a vehicle tracking system 306 that communicates with V1 310-1, V2 310-2, and/or Vn 310-n as described with reference to FIG. 1. In contrast to FIG. 1, the example of FIG. 3A illustrates the flow of data to the safety cloud 302. In an embodiment, AV1 308-1, AV2 308-2, and/or AVn 308-n share alerting vehicle data with the alert tracking system 304 via wireless connections (represented by arrows 312-1, 312-2, and 312-n). The alert tracking system 304 then shares the alerting vehicle data with the safety cloud 302 (represented by arrow 314). In an embodiment, V1 310-1, V2 310-2, and/or Vn 310-*n* share vehicle data (not shown) with the vehicle tracking system 306 via wireless connections (represented by arrows 316-1, 316-2, and 316-*n*). The vehicle tracking system 306 then shares the vehicle data with the safety cloud 302 (represented by arrow 318).

In some embodiments, AV1 308-1, AV2 308-2, and/or AVn 308-*n* share alerting vehicle data directly with the safety cloud 302 (represented by arrow 320), and/or V1 310-1, V2 310-2, and/or Vn 310-*n* share vehicle data directly with the safety cloud 302 (represented by arrow 322). In such an embodiment, AV1 308-1, AV2 308-2, and/or AVn 308-*n* share alerting vehicle data directly with the safety cloud 302 by bypassing the alert tracking system 304, and V1 310-1, V2 310-2, and/or Vn 310-*n* share vehicle data directly with the safety cloud 302 by bypassing the vehicle tracking system 306.

Although the alert tracking system 304 is described as sharing alerting vehicle data from AV1 308-1, AV2 308-2, and/or AVn 308-*n*, the alert tracking system may also share data from other vehicles or devices (e.g., a roadside vehicle, a roadside sensor, a maintenance vehicle, a construction site device, etc.). Additionally, the alerting vehicle data may correspond to other alert-related data such as, for example, a weather hazard, a lane closure, a road obstruction, a construction site, traffic, etc. In some embodiments, other parties may have access to the alert tracking system 304, such that the other parties (e.g., construction teams, utility teams, weather tracking teams, etc.) may tap into the alert tracking system and input/send alert-related data to the safety cloud 302 to indicate a safety hazard and/or an alerting zone. In such an embodiment, the other parties may input alert-related data that includes a specific location (e.g., an address or longitude and latitude coordinates) and/or a zone to indicate the safety hazard and/or the alerting zone.

FIG. 3B illustrates the flow of data to vehicles. The flow of data to the vehicles may represent a process for updating/changing a data reporting mode of the vehicles. In particular, the example of FIG. 3B illustrates the safety system 300 that includes the safety cloud 302, the alert tracking system 304 that communicates with AV1 308-1, AV2 308-2, and/or AVn 308-*n*, and the vehicle tracking system 306 that communicates with V1 310-1, V2 310-2, and/or Vn 310-*n* as described with reference to FIG. 3A. In contrast to FIG. 3A, the example of FIG. 3B illustrates the flow of data to V1 310-1, V2 310-2, and/or Vn 310-*n*. The safety cloud 302 may generate a policy message for transmission to V1 310-1, V2 310-2, and/or Vn 310-*n* when the data reporting mode needs to be changed. In an embodiment, the safety cloud 302 sends the policy message to the vehicle tracking system 306 (represented by arrow 324). The vehicle tracking system 306 then sends the policy message to V1 310-1, V2 310-2, and/or Vn 310-*n* via wireless connections (represented by arrows 326-1, 326-2, and 326-*n*). In another embodiment, the safety cloud 302 sends the policy message directly to V1 310-1, V2 310-2, and/or Vn 310-*n* via a wireless connection (represented by arrow 328). In some embodiments, the same policy message is sent to all the vehicles included in the safety system 300. In some embodiments, the policy message is vehicle-specific, such that a different policy message is sent to each of the vehicles included in the safety system 300.

In an embodiment, a safety cloud may monitor a vehicle to ensure the vehicle is using a desired data reporting mode of an alerting zone. In such an embodiment, the safety cloud may use a certain technique when receiving vehicle data and determining whether to update a data reporting mode of the vehicle. In some embodiments, monitoring the vehicle, receiving the vehicle data, and determining whether to update the data reporting mode of the vehicle may be performed by the safety cloud in a timely manner that is fast enough to help the vehicles avoid collisions with other vehicles (e.g., moving or stopped vehicles), safety hazards, and other events associated with an alerting zone. An example of a technique for vehicle data collection is described in further detail with reference to FIG. 4.

Figure 4:
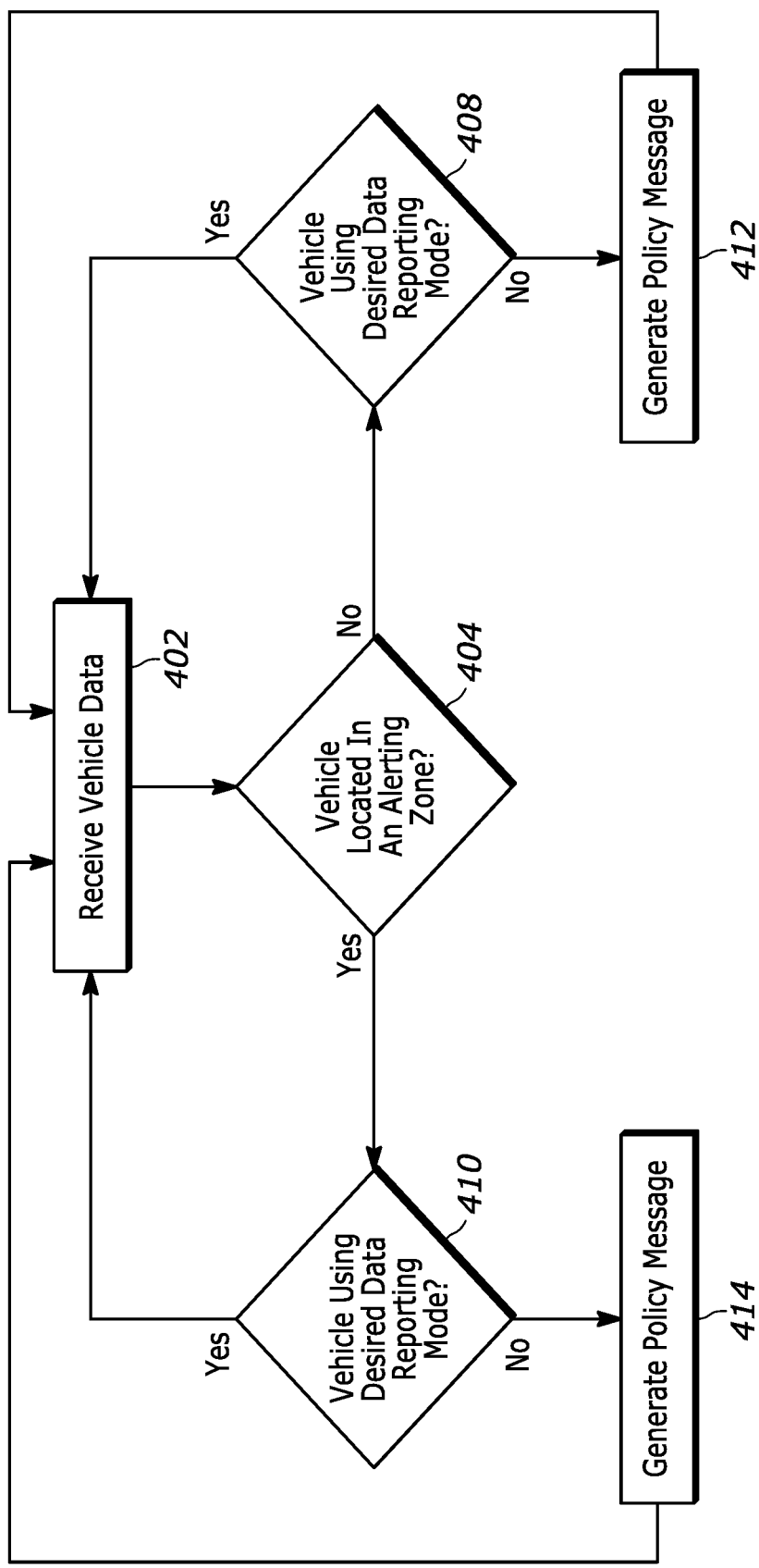
FIG. 4 depicts a flow diagram of a technique for vehicle data collection.

FIG. 4 depicts a flow diagram of a technique for vehicle data collection. The technique for vehicle data collection shown in FIG. 4 may be implemented by a safety cloud. In an embodiment, the technique for vehicle data collection may be implemented by safety cloud 102 in safety system 100 when communicating with alert tracking system 104, vehicle tracking system 106, AVs 108-1, 108-2, and 108-*n*, and Vs 110-1, 110-2, and 110-*n* (FIG. 1).

At block 402, the technique involves receiving vehicle data (e.g., from V1 110-1, V2 110-2, and/or Vn 110-*n*). In some embodiments, the vehicle data indicates a location of a vehicle and a data reporting mode of the vehicle. As an example, the vehicle data may be included in a vehicle data message that is sent by V1 110-1, V2 110-2, and/or Vn 110-*n* to vehicle tracking system 106 and/or safety cloud 102.

At decision point 404, the technique involves using the vehicle data to determine whether the vehicle is located in an alerting zone. Based on the alerting zone determination, the technique then involves determining if a data reporting mode of the vehicle needs to be changed at decision point 408 or at decision point 410.

If the vehicle is not located in the alerting zone (shown by "No"), i.e., the vehicle is located outside the alerting zone, then at decision point 408, the technique involves determining if the vehicle is using a desired data reporting mode. If the vehicle is using the desired data reporting mode (shown by "Yes"), i.e., the data reporting mode of the vehicle is the same as the desired data reporting mode, then the technique involves returning to block 402. If the vehicle is not using the desired data reporting mode (shown by "No"), i.e., the data reporting mode of the vehicle is different from the desired data reporting mode, then a policy message is generated at block 412. In an embodiment, the policy message is sent to the vehicle by the safety cloud and/or by the vehicle tracking system over a wireless connection. After the policy message is generated, the technique involves returning to block 402.

If the vehicle is located in the alerting zone (shown by "Yes"), then at decision point 410, the technique involves determining if the vehicle is using a desired data reporting mode. If the vehicle is using the desired data reporting mode (shown by "Yes"), i.e., the data reporting mode of the vehicle is the same as the desired data reporting mode, then the technique involves returning to block 402. If the vehicle is not using the desired data reporting mode (shown by "No"), i.e., the data reporting mode of the vehicle is different from the desired data reporting mode, then a policy message is generated at block 414. In an embodiment, the policy message is sent to the vehicle by the safety cloud and/or by the vehicle tracking system over a wireless connection. After the policy message is generated, the technique involves returning to block 402.

In some embodiments, determining whether the vehicle is located in the alerting zone, for example, decision point 404, includes receiving an alerting vehicle data message that includes alerting vehicle information that corresponds to an alerting vehicle (e.g., AV1 108-1, AV2 108-2, and/or AVn 108-*n*). As an example, the alerting vehicle information includes a location (e.g., longitude and latitude coordinates), a speed, and/or a direction of an alerting vehicle, and may also include a status (e.g., emergency lights on, siren, doing roadwork, etc.) that indicates whether the alerting vehicle is in a mode that needs an alerting zone. The safety cloud may then determine a geographical area of the alerting zone using the alerting vehicle information, and compare the location of the vehicle to the geographical area of the alerting zone. In some embodiments, determining if the data reporting mode of the vehicle needs to be changed, for example, at decision point 408 or at decision point 410, includes determining a desired data reporting mode associated with the alerting zone using the alerting vehicle information, and comparing the data reporting mode of the vehicle to the desired data reporting mode associated with the alerting zone. Examples of messages that may be sent and/or received in a safety system (e.g., safety system 100 (FIG. 1)) are described in further detail with reference to FIGS. 5-7.

Figure 5:
FIG. 5 depicts an example of an alerting vehicle data message generated by an alerting vehicle.

FIG. 5 depicts an example of an alerting vehicle data message 500 generated by an alerting vehicle. In particular, the alerting vehicle data message 500 shown in FIG. 5 includes two fields, implemented as an alert ID field 502 and an alerting vehicle information field 504. The alert ID field 502 may include an alert ID that corresponds to an alerting vehicle (e.g., AV1 108-1, AV2 108-2, and/or AVn 108-n), such that the alert ID may indicate whether the alerting vehicle has its emergency lights on/off. The alerting vehicle information field 504 may include alerting vehicle information that indicates a location, a speed, and/or a direction of the alerting vehicle. Although the alerting vehicle data message 500 is shown in FIG. 5 as including two fields, the alerting vehicle data message may have more than or less than two fields that indicate the same or different information. In an embodiment, the alerting vehicle data message 500 is sent by an alerting vehicle (e.g., AV1 108-1, AV2 108-2, and/or AVn 108-n (FIG. 1)) to an alert tracking system (e.g., alert tracking system 104 (FIG. 1)) via a first service provider network, and then shared with a safety cloud (e.g., safety cloud 102 (FIG. 1)) by the alert tracking system. In another embodiment, the alerting vehicle data message 500 is sent by the alerting vehicle to the safety cloud via the first service provider network.

Figure 6:
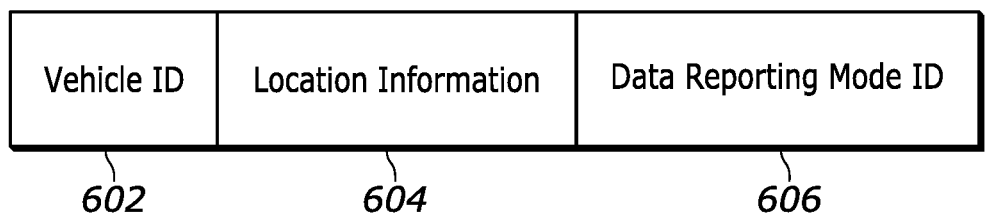
FIG. 6 depicts an example of a vehicle data message generated by a vehicle.

FIG. 6 depicts an example of a vehicle data message 600 generated by a vehicle. In particular, the vehicle data message 600 shown in FIG. 6 includes three fields, implemented as a vehicle ID field 602, a location information field 604, and a data reporting mode ID field 606. The vehicle ID field 602 may indicate a vehicle ID that corresponds to a vehicle (e.g., V1 110-1, V2 110-2, and/or Vn 110-n). The location information field 604 may indicate location information that corresponds a location of the vehicle. The location information field 604 may also indicate a speed and/or a direction of the vehicle. The data reporting mode ID field 606 may indicate a data reporting mode ID that corresponds to a data reporting mode of the vehicle. As an example, the data reporting mode of the vehicle may be indicated by a code that corresponds to the data reporting mode, a single bit (e.g., 0/1) that corresponds to the data reporting more, or a more complex indicator that corresponds to the data reporting mode.

Although the vehicle data message 600 is shown in FIG. 6 as including three fields, the vehicle data message may have more than or less than three fields that indicate the same or different information. In an embodiment, the vehicle data message 600 is sent by a vehicle (e.g., V1 110-1, V2 110-2, and/or Vn 110-n (FIG. 1)) to a vehicle tracking system (e.g., vehicle tracking system 106 (FIG. 1)) via a first service provider network, and then shared with a safety cloud (e.g., safety cloud 102 (FIG. 1)) by the vehicle tracking system. In another embodiment, the vehicle data message 600 is sent by the vehicle to the safety cloud via the first service provider network.

Figure 7:
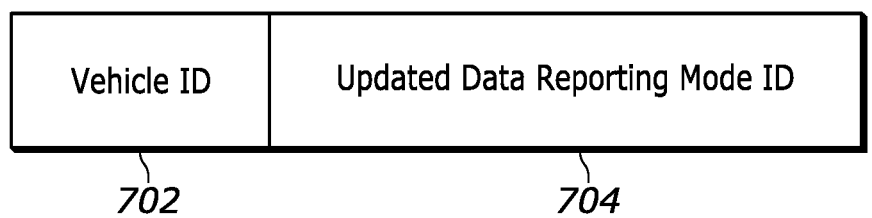
FIG. 7 depicts an example of a policy message generated by a safety cloud.

FIG. 7 depicts an example of a policy message 700 generated by a safety cloud (e.g., safety cloud 102 (FIG. 1)). In particular, the policy message 700 shown in FIG. 7 includes two fields, implemented as a vehicle ID field 702 and an updated data reporting mode ID field 704. The vehicle ID field 702 may indicate a vehicle ID that corresponds to a vehicle (e.g., V1 110-1, V2 110-2, and/or Vn 110-n (FIG. 1)), such that the vehicle ID is vehicle-specific. By using the vehicle ID, the policy message indicates which vehicle the policy message is intended for. Thus, the vehicle ID may improve the overall accuracy when updating the data reporting mode because the intended vehicle is more likely receive its updated data reporting mode. The updated data reporting mode ID field 704 may indicate an updated data reporting mode ID that corresponds to an updated data reporting mode for the vehicle. In an embodiment, the updated data reporting mode ID field 704 has a value of "fast" or "slow". Although the policy message 700 is shown in FIG. 7 as including two fields, the policy message may have more than or less than two fields that indicate the same or different information. In an embodiment, the policy message 700 is shared with a vehicle tracking system (e.g., vehicle tracking system 106 (FIG. 1)) by a safety cloud (e.g., safety cloud 102 (FIG. 1)), and then sent by the vehicle tracking system to a transceiver of a vehicle (e.g., V1 110-1, V2 110-2, and/or Vn 110-n (FIG. 1)) via a first service provider network. In another embodiment, the policy message 700 is sent by the safety cloud to the transceiver of the vehicle via the first service provider network. In yet another embodiment, the policy message 700 is sent by the safety cloud to a broadcasting tower near an alerting zone via the first service provider network, and then sent by the broadcasting tower to the transceiver of the vehicle via the second service provider network.

FIG. 8 is a table 800 that includes example parameters of data reporting modes. The table 800 includes parameters for an example "alert mode" and an example "conservation mode". Examples of the parameters include, but are not limited to, "frequency of transmissions", "content A (e.g., longitude/latitude)", "content B (e.g., speed and direction)", "physical channel options", and "network options (5G vs. 3/4G)". Although not shown, other parameters may include vehicle statistics such as, for example, steering column, braking, acceleration, etc.

In an embodiment, the parameters of the "alert mode" and the "conservation mode" represent a preset alert mode configuration and a preset conservation mode configuration, respectively. The preset alert mode configuration and the preset conservation mode configuration may include predefined vehicle data content, predefined transmission parameters, predefined network options, and predefined physical channel options. For example, the predefined vehicle data content includes "content A (e.g., longitude/latitude)" and/or "content B (e.g., speed and direction)", the predefined transmission parameters are defined by "frequency of transmissions", the predefined network options are defined by "network options (5G vs. 3/4G)", and the predefined physical channel options are defined by "physical channel options". The predefined vehicle data content may also include a reporting cadence in time, a reporting cadence in distance, alert geometry, a time to reset out of the "alert mode", etc.

In an embodiment, the preset alert mode configuration ("alert mode") includes parameters: 10 transmissions per minute, content A included (e.g., longitude/latitude), content B included (e.g., speed and direction), all available physical channel options, and 3G, 4G, or 5G. In an embodiment, the preset conservation mode configuration ("conservation mode") includes parameters: 2 transmissions per minute, content A included (e.g., longitude/latitude), content B not included (e.g., speed and direction), only energy efficient channel options, and 3G or 4G.

By using the alert mode, a more timely location of a vehicle may be determined. For example, changes in the vehicle's direction and/or speed can be identified more quickly. As such, a safety cloud (e.g., safety cloud 102 (FIG. 1)) can identify when the vehicle may be approaching an alerting zone, a safety hazard, and/or an emergency site, such as described with reference to the alerting zone 200 and the destination 206 of FIG. 2A, and can alert the vehicle accordingly.

By using the conservation mode, a vehicle may be able to conserve energy consumption and data storage. Using the conservation mode also allows the vehicle to conserve bandwidth, reduce congestion, and free up onboard resources and data transfer costs.

In some embodiments, the alert mode and/or the conservation mode may be a combination of parameters or one parameter. As an example, the alert mode may be defined by one parameter that indicates an alert mode vehicle data transmission frequency of one transmission per second. As another example, the conservation mode may be defined by one parameter that indicates a conservation mode vehicle data transmission frequency of one transmission per five seconds.

Figure 9:
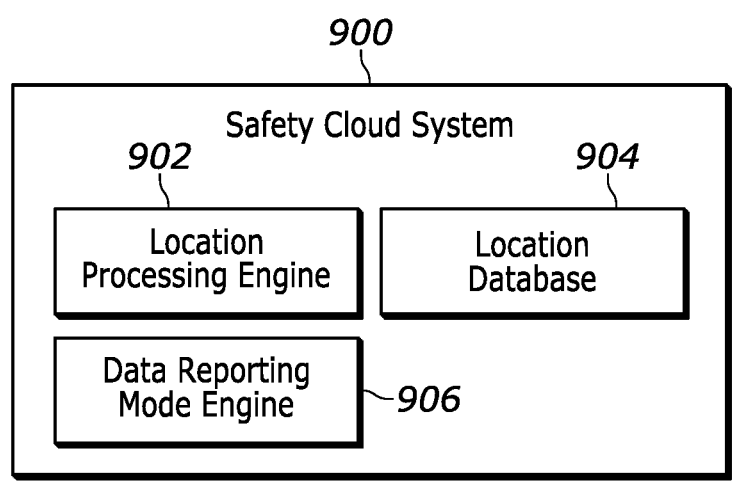
FIG. 9 is a high-level block diagram of a safety cloud system.

FIG. 9 is a high-level block diagram of a safety cloud system 900. The safety cloud system 900 may represent an embodiment of the safety cloud 102 shown in FIG. 1. In particular, the safety cloud system 900 includes a location processing engine 902, a location database 904, and a data reporting mode engine 906.

The location processing engine 902 may be configured to process alerting vehicle information from alerting vehicle data messages (e.g., alerting vehicle data message 500 (FIG. 5)) to determine a geographical area of an alerting zone. In an embodiment, the alerting vehicle information and the geographical area of the alerting zone are stored in the location database 904.

The location processing engine 902 may also be configured to process location information from a vehicle data message (e.g., vehicle data message 600 (FIG. 6)) to determine a location of a vehicle. To determine whether the vehicle is located in the alerting zone, the location processing engine 902 compares the location of the vehicle to the geographical area of the alerting zone that is stored in the location database 904.

The data reporting mode engine 906 may be configured to process alerting vehicle information from an alerting vehicle data message (e.g., alerting vehicle data message 500 (FIG. 5)) to determine a desired data reporting mode associated with the alerting zone. Additionally, the data reporting mode engine 906 may be configured to process a data reporting mode ID from the vehicle data message to determine a data reporting mode of the vehicle. To determine whether the data reporting mode of the vehicle needs to be updated, the data reporting mode engine 906 compares the data reporting mode of the vehicle to the desired data reporting mode associated with the alerting zone.

Figure 10:
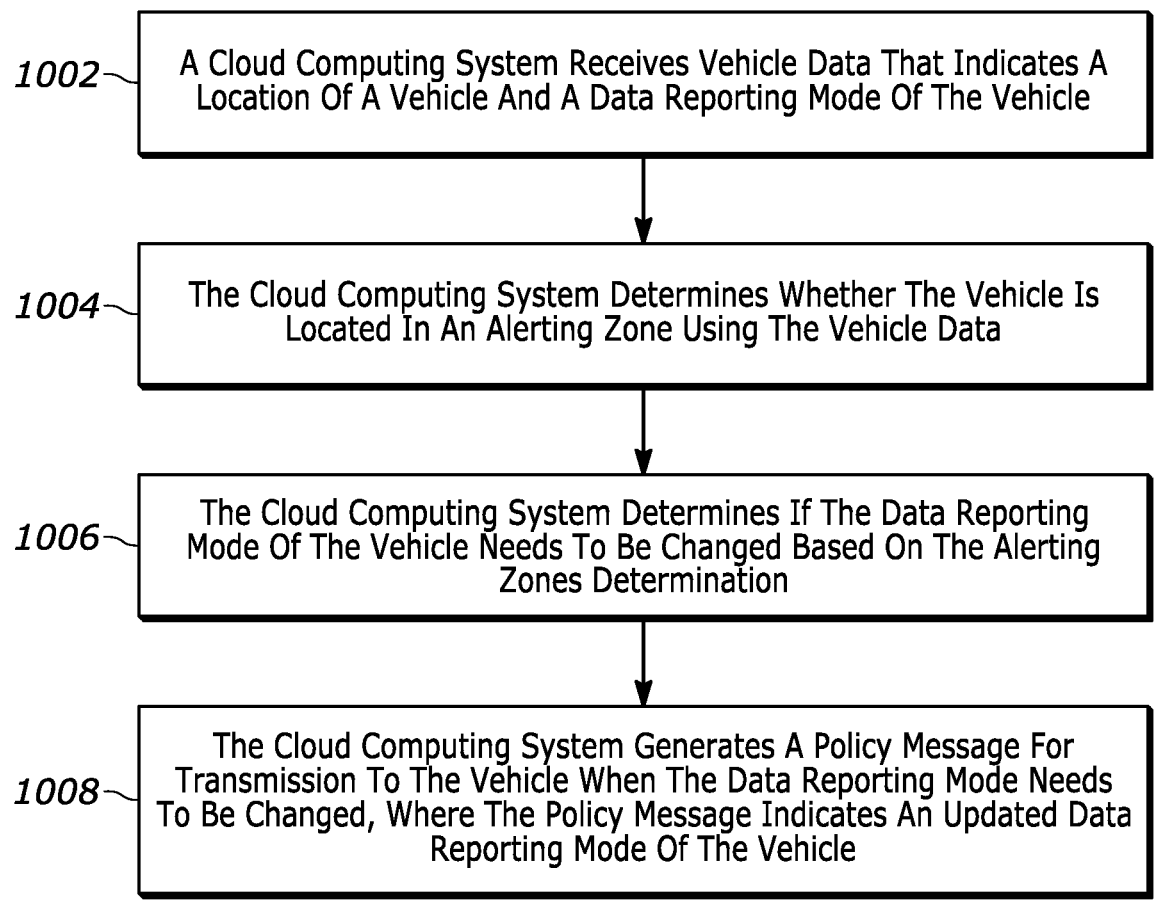
FIG. 10 illustrates a flow diagram of a technique for vehicle data collection in accordance with an embodiment of the invention.

FIG. 10 illustrates a flow diagram of a technique for vehicle data collection in accordance with an embodiment of the invention. At block 1002, a cloud computing system receives vehicle data that indicates a location of a vehicle and a data reporting mode of the vehicle. At block 1004, the cloud computing system determines whether the vehicle is located in an alerting zone using the vehicle data. At block 1006, the cloud computing system determines if the data reporting mode of the vehicle needs to be changed based on the alerting zone determination. At block 1008, the cloud computing system generates a policy message for transmission to the vehicle when the data reporting mode needs to be changed, where the policy message indicates an updated data reporting mode of the vehicle.

In some embodiments, the technique for vehicle data collection includes a non-transitory computer readable medium including instructions to be executed in a computer system. For example, the instructions when executed in the computer system perform a technique that includes receiving vehicle data that indicates a location of a vehicle and a data reporting mode of the vehicle, determining, using the vehicle data, whether the vehicle is located in an alerting zone, determining if the data reporting mode of the vehicle needs to be changed based on the alerting zone determination, and generating a policy message for transmission to the vehicle when the data reporting mode needs to be changed, where the policy message indicates an updated data reporting mode of the vehicle.

In some embodiments, the technique for vehicle data collection includes a non-transitory computer readable medium including instructions to be executed in a computer system. For example, the instructions when executed in the computer system perform a technique that includes sending vehicle data that indicates a location of a vehicle and a data reporting mode of the vehicle, receiving a policy message when the data reporting mode needs to be changed, where the policy message indicates an updated data reporting mode of the vehicle based on the location of the vehicle, and changing the data reporting mode of the vehicle according to the updated data reporting mode. In some embodiments, the computer system that executes the instructions for vehicle data collection may be a safety cloud (e.g., safety cloud 102 (FIG. 1)) or a safety cloud computing system.

Figure 11:
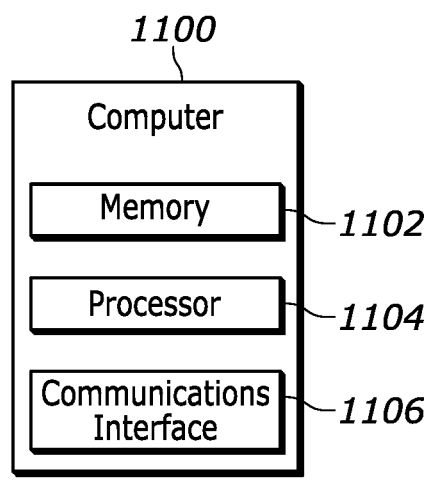
FIG. 11 depicts an example of a computer that can implement the technique for vehicle data collection as described with reference to FIG. 10.

In an embodiment, the above-described functionality is performed at least in part by a computer or computers, which executes computer readable instructions. FIG. 11 depicts an example of a computer that can implement the technique for vehicle data collection as described with reference to FIG. 10. As shown, the computer 1100 includes a memory 1102, a processor 1104, and a communications interface 1106. The processor may include a multifunction processor and/or an application-specific processor. As an example, the processor could be a central processing unit (CPU) (with software), an application-specific integrated circuit (ASIC), a transceiver, a radio, or a combination thereof. The memory within the computer may include, for example, storage medium such as read only memory (ROM), flash memory, random access memory (RAM), and a large capacity permanent storage device such as a hard disk drive. The communications interface enables communications with other computers via, for example, the Internet Protocol (IP). The computer executes computer readable instructions stored in the storage medium to implement various tasks as described above.

As an example, the computer 1100 may represent a safety cloud (e.g., safety cloud 102 (FIG. 1)) or a safety cloud computing system. As another example, the computer 1100 may represent a transceiver and/or a receiver of a device (e.g., a transceiver and/or a receiver of V1 110-1 and/or AV1 108-1 (FIG. 1)) or of a system (e.g., vehicle tracking system 106 and/or alert tracking system 104 (FIG. 1)). In such an example, the computer includes a non-transitory computer readable medium comprising instructions to be executed in a computer system. As an example, the computer system may include or connect to antennas, processors, batteries, storage mediums, etc., and may be configured to perform wireless operations and/or communications.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It is understood that the scope of the protection for systems and methods disclosed herein is extended to such a program and in addition to a computer readable means having a message therein, such computer readable storage means contain program code means for implementation of one or more steps of the method, when the program runs on a server or mobile device or any suitable programmable device.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

While the above-described techniques are described in a general context, those skilled in the art will recognize that the above-described techniques may be implemented in software, hardware, firmware, or a combination thereof. The above-described embodiments of the invention may also be implemented, for example, by operating a computer system to execute a sequence of machine-readable instructions. The instructions may reside in various types of computer readable media. In this respect, another aspect of the present invention concerns a programmed product, comprising computer readable media tangibly embodying a program of machine-readable instructions executable by a digital data processor to perform the method in accordance with an embodiment of the present invention.

The computer readable media may comprise, for example, random access memory (not shown) contained within the computer. Alternatively, the instructions may be contained in another computer readable media such as a magnetic data storage diskette and directly or indirectly accessed by a computer system. Whether contained in the computer system or elsewhere, the instructions may be stored on a variety of machine-readable storage media, such as a direct access storage device (DASD) storage (e.g., a conventional "hard drive" or a Redundant Array of Independent Drives (RAID) array), magnetic tape, electronic read-only memory, an optical storage device (e.g., CD ROM, WORM, DVD, digital optical tape), paper "punch" cards. In an illustrative embodiment of the invention, the machine-readable instructions may comprise lines of compiled C, C++, or similar language code commonly used by those skilled in the programming for this type of application arts.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the claims as described herein.

What is claimed is:

1. A method for vehicle data collection, the method comprising:
   receiving, at a cloud computing system, vehicle data that indicates a location of a vehicle and a data reporting mode of the vehicle;
   determining, by the cloud computing system, whether the vehicle is located in an alerting zone using the vehicle data;
   determining, by the cloud computing system, if the data reporting mode of the vehicle needs to be changed based on the alerting zone determination; and
   generating, by the cloud computing system, a policy message for transmission to the vehicle when the data reporting mode needs to be changed, wherein the policy message indicates an updated data reporting mode of the vehicle.

2. The method of claim 1, wherein determining whether the vehicle is located in the alerting zone includes:
   receiving an alerting vehicle data message that includes alerting vehicle information;
   determining a geographical area of the alerting zone using the alerting vehicle information; and
   comparing the location of the vehicle to the geographical area of the alerting zone.

3. The method of claim 2, wherein the geographical area of the alerting zone is defined by a set of geographical coordinates that are within a predetermined range set.

4. The method of claim 1, wherein determining if the data reporting mode of the vehicle needs to be changed includes:
   receiving an alerting vehicle data message that includes alerting vehicle information;
   determining a desired data reporting mode associated with the alerting zone using the alerting vehicle information; and
   comparing the data reporting mode of the vehicle to the desired data reporting mode associated with the alerting zone.

5. The method of claim 1, wherein:
   determining whether the vehicle is located in the alerting zone includes:
     receiving alerting vehicle information that includes alerting vehicle information;
     determining a geographical area of the alerting zone using the alerting vehicle information;
     comparing the location of the vehicle to the geographical area of the alerting zone;
   determining if the data reporting mode of the vehicle needs to be changed includes:
     determining a desired data reporting mode associated with the alerting zone using the alerting vehicle information; and
     comparing the data reporting mode of the vehicle to the desired data reporting mode associated with the alerting zone.

6. The method of claim 5, wherein the alerting vehicle information is included in an alerting vehicle data message that is received from at least one of an alerting vehicle and an alert tracking system.

7. The method of claim 1, wherein the method includes:
   determining that the vehicle is located in the alerting zone;
   determining that the data reporting mode is different from a desired data reporting mode; and
   generating the policy message for transmission to the vehicle, wherein the policy message indicates the desired data reporting mode as the updated data reporting mode.

8. The method of claim 1, wherein the method includes:
   determining that the vehicle is located in the alerting zone;
   determining that the data reporting mode is the same as a desired data reporting mode; and
   returning to the step of receiving the vehicle data.

9. The method of claim 1, wherein the method includes:
   determining that the vehicle is located outside the alerting zone;
   determining that the data reporting mode is different from a desired data reporting mode; and
   generating the policy message for transmission to the vehicle, wherein the policy message indicates the desired data reporting mode as the updated data reporting mode.

10. The method of claim 1, wherein the method includes:
    determining that the vehicle is located outside the alerting zone;
    determining that the data reporting mode is the same as a desired data reporting mode; and
    returning to the step of receiving the vehicle data.

11. The method of claim 1, wherein the updated data reporting mode is an alert mode, and wherein a preset alert mode configuration includes:
    predefined vehicle data content;
    predefined transmission parameters;
    predefined network options; and
    predefined physical channel options.

12. The method of claim 1, wherein the updated data reporting mode is a conservation mode, and wherein a preset conservation mode configuration includes:
    predefined vehicle data content;
    predefined transmission parameters;
    predefined network options; and
    predefined physical channel options.

13. The method of claim 1, wherein the vehicle data is included in a vehicle data message that includes:
    a vehicle identifier (ID) that corresponds to the vehicle;
    location information that corresponds to the location of the vehicle; and
    a data reporting mode ID that corresponds to the data reporting mode of the vehicle.

14. The method of claim 1, wherein the policy message includes:
    a vehicle ID that corresponds to the vehicle; and
    an updated data reporting mode ID that corresponds to the updated data reporting mode.

15. The method of claim 1, wherein the alerting zone is determined from an alerting vehicle data message that includes:
    an alert ID that corresponds to an alerting vehicle; and
    alerting vehicle information that indicates at least one of a location of the alerting vehicle, a speed of the alerting vehicle, and a direction of the alerting vehicle.

16. The method of claim 1, wherein generating the policy message for transmission to the vehicle includes:
    sending, by a safety cloud, the policy message to a transceiver of the vehicle via a service provider network.

17. The method of claim 1, wherein generating the policy message for transmission to the vehicle includes:
    sharing, by a safety cloud, the policy message with a vehicle tracking system; and
    sending, by the vehicle tracking system, the policy message to a transceiver of the vehicle via a first service provider network.

18. The method of claim 1, wherein generating the policy message for transmission to the vehicle includes:
    sending, by a safety cloud, the policy message to a broadcasting tower near the alerting zone via a first service provider network; and
    sending, by the broadcasting tower, the policy message to a transceiver of the vehicle via a second service provider network.

19. A non-transitory computer readable medium comprising instructions to be executed in a computer system, wherein the instructions when executed in the computer system perform a method comprising:
    receiving vehicle data that indicates a location of a vehicle and a data reporting mode of the vehicle;
    determining, using the vehicle data, whether the vehicle is located in an alerting zone;
    determining if the data reporting mode of the vehicle needs to be changed based on the alerting zone determination; and
    generating a policy message for transmission to the vehicle when the data reporting mode needs to be changed, wherein the policy message indicates an updated data reporting mode of the vehicle.

20. A non-transitory computer readable medium comprising instructions to be executed in a computer system, wherein the instructions when executed in the computer system perform a method comprising:
    sending vehicle data that indicates a location of a vehicle and a data reporting mode of the vehicle;
    receiving a policy message when the data reporting mode needs to be changed, wherein the policy message indicates an updated data reporting mode of the vehicle based on the location of the vehicle; and
    changing the data reporting mode of the vehicle according to the updated data reporting mode.

* * * * *